United States Patent Office 3,293,286
Patented Dec. 20, 1966

3,293,286
PROCESS FOR PREPARING TERPENIC ESTERS WITH A PHOSPHORUS - CONTAINING CATALYST
Robert L. Webb, Jacksonville, Fla., assignor, by mesne assignments, to Union Camp Corporation, a corporation of Virginia
No Drawing. Filed Feb. 6, 1964, Ser. No. 343,125
19 Claims. (Cl. 260—489)

This invention is concerned with converting terpenic halides to the corresponding terpenic acyloxy compounds by treatment of the halides with salts of carboxylic acids. It is more particularly concerned with improvements in the conversion of terpenic allylic chlorides to the corresponding esters by treatment with salts of carboxylic acids in the presence of certain trivalent and quaternary phosphorus compounds which function as catalysts for the displacement of the chloride group by the acyloxy group.

It is known to produce terpenic allylic halides in several ways such as:

(A) Addition of hydrogen halide to terpenes possessing conjugate unsaturation, usually hydrogen chloride for reasons of economy though hydrogen bromide is satisfactory and in some cases gives a halide of superior reactivity. It is known to produce linalyl/geranyl/neryl chloride or bromide by addition of the appropriate hydrogen halide to myrcene in mol/mol ratio and to produce the corresponding 2-halo-dihydro linalyl/geranyl/neryl halide by addition of two moles of hydrogen chloride or bromide to one of myrcene. Other terpenes possessing a conjugate system of double bonds which readily add a mole of hydrogen chloride or bromide to form allylic halides are alloocimene, ocimene, alpha-terpinene, the phellandrenes, the pyronenes and p-menthadiene-2,4(8). Those dehydro-terpenes containing a conjugate system of double bonds such as verbenene, dehydrophellandrenes and dehydromyrcene also readily add hydrogen chloride or bromide to produce allylic terpene halides.

(B) Unsaturated terpenes or dihydroterpenes can be chlorinated or brominated to yield allylic chlorides (bromides). Thus, on chlorination, alpha pinene yields pinocarvyl chloride, limonene yields carvyl chloride, carvomenthene yields carvotancetyl chloride, myrcene yields 3-chloro-2-methyl-6-methylene-1,7-octadiene, 3-menthene yields 5-chloro-3-menthene. Also, alpha terpinene, gamma terpinene, terpinolene, pyronenes, alloocimene, the dihydroalloocimenes, the dihydro myrcenes and 3-carene all may be chlorinated or brominated to yield allylic terpenic halides.

For the purpose of this specification, a terpene is defined as a hydrocarbon containing ten carbon atoms in an unbroken chain and a terpenic allylic halide is a terpenic allylic chloride or bromide.

Terpenic allylic chlorides can also be produced by chlorination of substituted hydrocarbons. Thus, alpha terpineol, which may be considered 8-hydroxy carvomenthene yields 8-hydroxy-carvotanacetyl chloride. Bromination of alpha terpinyl chloride yields 8-chloro-carvotanacetyl bromide.

Terpenic allylic halides are therefore readily available from domestic raw materials, such as the various turpentines and citrus limonene and when treated with salts of carboxylic acids yield allylic terpenic esters which are useful in perfumery and flavor as such. These esters may also be saponified to produce the free alcohols which are also used in perfumery and flavor. Thus, myrcene hydrochloride yields geranyl acetate which is useful as such or may be saponified to geraniol. In turn, geraniol may be used as such or may be converted by hydrogenation to citronellol, also useful in the same industry.

Carvyl chloride similarly yields carvyl esters and the carveols, compounds of the spearmint family, and 5-chloro-3-menthene yields compounds useful as intermediates to produce compounds found in peppermint flavors.

The allylic terpenic halides are relatively reactive as compared to non-allylic terpenic halides, but are not converted in high yields to the esters by heating them with salts of carboxylic acids unless a catalyst is present. The allylic terpenic halides dehydrohalogenate relatively easily, so that at elevated temperatures of say 80° C. to 150° C., where their reaction rates with salts of carboxylic acids are appreciable though still low, the accompanying dehydrohalogenation severely limits the yield of ester product and relatively large amounts of hydrocarbons are formed. While the stability of terpenic allylic halides varies considerably, depending on the structure of the compound, it is found desirable to employ as low a temperature for the conversion to esters as is consistent with reasonable and economic reaction time.

It has been found that the reaction of the allylic terpenic halide with the carboxylic acid salt is catalyzed by the presence of phosphorus or phosphorus derivatives, so that much more ester and much less hydrocarbon by-products are produced than if no phosphorous catalyst were present. Furthermore, the allylic terpenic halide appears to be stabilized in many cases with respect to dehydrochlorination by the presence of the phosphorus catalyst.

It is accordingly an object of this invention to provide an improved method for reacting allylic terpenic halides with salts of carboxylic acids to produce esters.

Another object is to provide catalysts for reacting allylic terpenic chlorides or bromides with salts of carboxylic acids to produce allylic terpenic esters.

Another object is to provide a method for obtaining high yields of terpenic allylic esters and alcohols from inexpensive domestic raw materials such as the various turpentines.

In conducting the process of this invention, an allylic terpenic halide is treated with a salt of a carboxylic acid in the presence of a quaternary phosphonium salt or (a) phosphorus or (b) trivalent phosphorous compound capable of quaternization with a halide. While methyl iodide has probably been used most frequently for such quaternization, it is to be understood that many other compounds may be used. Trivalent phosphorus compounds such as phosphorus trichloride are of no value as catalysts, nor are alkyl phosphite esters such as trimethyl phosphite, which undergoes the Arbusov reaction. Trivalent phosphorus compounds which are suitable include alkyl phosphines, mixed alkyl-aryl phosphines, aryl phosphines and amino phosphines. These may be represented as

where R, $R_1$ and $R_2$ may be hydrogen, alkyl, cycloalkyl, aryl, alkylamino, aryl amino, aryl amino or cycloalkylamino groups or an amino group. It is understood, however, that polyamino-phosphines are known to be unstable and condense to higher molecular weight species.

Throughout this specification and claims the terms "phosphonium salt," "quaternary phosphonium salt," and "salt of a quaternary phosphorus base" are synonymous and are intended to include (1) the usually recognized meaning of these terms, wherein all four hydrogen atoms are replaced with organic radicals in which the phosphorus atom is attached directly to a carbon or nitrogen atom, as well as (2) the same compounds of phosphorus as included in (1), except that less than four hydrogen atoms are replaced. For instance, the catalysts within the scope of this invention include compounds having the phosphonium radical

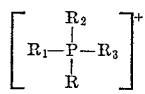

in which R, $R_1$, $R_2$ and $R_3$ have the same meaning as in the foregoing paragraph.

It is to be pointed out that amino phosphines quaternize with alkyl halides to produce quaternary phosphonium compounds, as proved by Sisler and Smith, Journal of Organic Chemistry 26, 4733 (1961), who show that quarternization occurs on the phosphorus atom. This is further confirmed by Ewart et al., Journal of the Chemical Society, pages 3984–3990 (1962), who describe synthesis of compounds of the type phenyl-$P(NR_2)NR^1{}_2$, with R and $R^1$ representing methyl through propyl and who state "Both the chemical and the nuclear magnetic resonance investigations show that a very significant feature of the $N \cdot P \cdot N$ system, as with the $P \cdot N$ system, is the apparent complete lack of basic character on the part of the nitrogen." The amino phosphines are therefore not nitrogen bases.

It is well known that tertiary phosphines quaternize more readily than do the corresponding amines. (See "Phosphorus and Its Compounds," Van Wazer, Interscience Publishers, Inc., New York, N.Y., 1958, vol. 1, pages 210–211). Triphenyl amine does not quaternize nor does it act as a catalyst in the reaction between allylic terpene halides and salts of carboxylic acids, but triphenyl phosphine quaternizes readily and is a good catalyst for formation of esters by this method.

Although the marked tendency for tertiary phosphines to quaternize appears to be related to their catalytic activity, for the purpose of this invention, it is not certain that the precise mechanism of this activity involves formation of a terpenic quaternary salt which reacts with the salt of the carboxylic acid to form an unstable terpenic quaternary phosphonium salt of a carboxylic acid which then decomposes to the allylic terpenic ester and regenerates a phosphine. Such a mechanism would, however, explain the catalytic effect of the phosphine.

Furthermore, as shown in Example 7, quaternary phosphonium salts do act as strong catalysts for the displacement of the halide group in a terpenic allylic halide by the acyloxy group. Presumably one or more of the $C \cdot P$ linkage is broken in the presence of a carboxylic acid salt to form a phosphine and an ester $R-O-C(O)R^1$, whose R group is derived from the phosphonium salt and whose $R^1$ group is derived from the carboxylic acid salt employed. It has been shown that quaternary phosphonium salts of carboxylic acids do yield esters, a phosphine, the phosphine oxide, and a ketone when heated (Journal of Organic Chemistry 28, 1133), although the temperatures employed were much higher than are now found desirable. In the reaction described by this reference, only a part of the phosphorus is regenerated as a phosphine, the remainder being converted to the phosphine oxide, which is not an active catalyst in the process of my invention. It is therefore surprising that one can use only small amounts of a phosphine, or its equivalent, a phosphonium salt, and obtain high yields of ester. It is also noteworthy that there is no observed formation of appreciable amounts of ketones.

Although all tertiary phosphines which have been tested have catalytic effect, other phosphorus compounds may also be used with good results. These include phosphine, aryl/alkyl dihydrogen phosphines, aryl/alkyl monohydrogen phosphines and elemental phosphorus. In these cases it is assumed that the allylic terpenic halide employed alkylates, the phosphine, or phosphorus, and that catalytic quantities of tertiary phosphines are produced. Alkylation of phosphine, alkyl/aryl phosphines, and phosphorus by alkyl and allylic halides is well known. Use of these non-tertiary phosphines and phosphorus in the practice of this invention, therefore, represents in situ preparation of tertiary phosphines.

It is also known to produce phosphines by reacting alkyl halides with metal phosphides, a reaction which can be used in situ preparation of catalysts (see Examples 9–11). The metal phosphides that may be so used include the phosphides of the alkali metals—sodium, lithium, potassium, calcium, and the like—and other metals such as iron, zinc, copper, tin, aluminum, magnesium, and the like. Although phosphorus trichloride itself is not a catalyst for the purpose of this invention, it is known to produce phosphines by reaction of phosphorus trichloride and alkyl/allyl/aryl chlorides and bromides in the presence of a metal such as zinc or magnesium. One may therefore react the terpenic allylic halide with a small equivalent percent of magnesium and phosphorus trichloride, for example, to form catalytic quantities of phosphines, and then add the metal salt of a carboxylic acid and obtain good yields of ester.

A large number of suitable syntheses for trivalent phosphorus compounds capable of alkylation and, as a final alkylation step, quaternization, are described in "Organo Phosphorus Compounds," by Kosolapoff, John Wiley, New York (1950). In this reference, on pages 30–37 inclusive, Kosolapoff lists numerous phosphines and refers to the original literature wherein their preparation was described. Examples of primary, secondary, and tertiary phosphines suitable for this invention are disclosed, where the alkyl group, or groups, are straight or branches chain, or may be substituted by hydroxyl, halogen, or aryl groups. It is shown that the aryl group(s) may be alkyl or halogenated aryl group(s). The aryl group may be derived from benzene, diphenyl, or napthalene. A number of suitable (P) cyclic derivatives, wherein phosphorus is a member of a heterocyclic ring, are described. A number of suitable amino phosphines (which may also be termed triamides of phosphorous acid) are shown on page 304, where the amine employed is primary or secondary, and may be an alkyl, aryl, aralkyl, or heterocyclic. A large number of suitable phosphonium compounds are described on pages 86–94 inclusive.

Phosphine and phosphonium catalysts may be tested for the degree of activity by any of the procedures suggested in the examples or by a standardized procedure, whereby about 1.0 mole of geranyl chloride or other terpenic allylic chloride is treated with 1.5 moles sodium acetate or other alkali metal salt of a carboxylic acid and 0.2 mole sodium carbonate in an inert atmosphere at about 100° C. for 4 to 6 hours with a catalytic quantity of the phosphine, for example, 1 to 3% by weight based on the weight of terpenic allylic halide. Agitation is not necessary, but is desirable. If the phosphine tested is low boiling, the reaction is best conducted under autogenous pressure in an autoclave. At the end of the reaction time the product is washed up and assayed for ester content by infrared spectroanalysis or other suitable method, and the assay results are compared with results using the same ingredients and conditions, but without a phosphorus catalyst. It is found that the following representative phosphines and phosphonium salts catalyze ester formation to produce much more ester in the same length of time than the corresponding test blank control, were no catalyst used.

Suitable alkyl and aralkyl phospines include, but are not limited to, methyl phosphine, ethyl dibutyl phosphine, dimethyl heptyl phosphine, methyl-isobutyl-amyl phosphine, diamyl-cyclohexyl phosphine, triallyl phosphine, tris(diethylamino-ethyl) phosphine, 1-P-tolyl cyclopentamethylene phosphine, dihexyl phosphine, butyl-didodecyl-phosphine, 1-phenyl cyclotetramethylene phosphine, butyl-phenyl-phosphine, di amyl-naphthyl phosphine, p-xylyl-methyl-amyl phosphine, methyl-diphenyl phosphine, dimethylaminoethyl-n-propyl-phenyl phosphine, dimethyl-furfuryl phosphine, isoamyl-heptyl-p-tolyl phosphine, dimethyl-p-chlorophenyl phosphine, and methyl-dibenzyl phosphine, p-chlorbenzyl-amyl-phenyl phosphine and β-hydroxyethyl-amyl-cyclohexyl phosphine.

Suitable aminophosphines include, but are not limited to, methyl-bis (diethylamino) phosphine, methyl-phenyl-diethyl-amino-phosphine, diphenyl-piperidino phosphine, p-tolyl-dimorpholino phosphine, benzyl-bis (dimethylamino) phosphine, butyl-bis (dihexylamino) phosphine, bis (diphenyl phosphino) piperazine, tris (isobutylamino) phosphine, tris (benzylamino) phosphine, p-chlorophenyl-bis (dipropyl amino) phosphine and cyclohexyl-bis (t-butyl amino) phosphine.

Suitable aryl phosphines include, but are not limited to, tri (p-totyl) phosphine, p-chlorphenyl phosphine, di-p-xylyl phosphine, methyl-di(p-t-butyl phenyl) phosphine, phenyl phosphine, diphenyl-p-tolyl phosphine, p-bromo-phenyl-di-o-tolyl phosphine, tris (p-dimethyl amino phenyl) phosphine, diphenyl-p-hydroxy-phenyl phosphine and tris (p-diphenyl) phosphine.

It is to be appreciated that it is not ordinarily necessary to choose to employ pure compounds as catalysts, since one can employ crude phosphine mixtures resulting from any phosphine producing reaction. Kosolapoff, supra, suggests many references which disclose various means of producing such usable phosphines. Thus, one can employ mixed alkyl/aryl/cycloalkyl halides to produce a mixed Grignard reagent which will react with phosphorus trichloride to yield a large number of individual phosphines and the crude mixture may be used as catalyst. Similarly, one can react mixtures of primary and secondary amines with phosphorus trichloride (Example 8), phenyl dichlor phosphine or diphenyl chloro phosphine in a suitable solvent such as a hydrocarbon, wash out by-product amine hydrochloride and recover mixed amino phosphines suitable for use as catalysts.

Suitable completely organic substituted phosphonium salts for use as catalysts may be prepared and isolated by reaction of any of the above-named phosphines with reactive organic halides such as, for instance, methyl or allyl iodide, benzyl chloride, or terpene allylic halides. Ordinarily this is not particularly desirable, as the phosphines are good catalysts and quaternization apparently takes place in situ during the conversion of the terpenic allylic halide to the corresponding acyloxy compound.

There is no preference for one specific phosphine or phosphonium salt over others, and the basis for choice of catalyst is primarily an economic one. In choosing a catalyst one should balance efficiency and cost per pound to achieve lowest catalyst costs and from time to time choose different phosphorous catalysts in keeping with changing commercial availability and cost of phosphines or their precursors.

Of the various allotropic forms of phosphorus, it is preferred to employ yellow or white phosphorus, since it is cheaper and more readily converted to the phosphine catalyst.

In the practice of this invention the conversion of terpenic allylic halides to terpenic allylic esters in the presence of a phosphine, or its equivalent, a quaternary phosphonium salt, the incorporation of a base such as sodium, or potassium carbonate, bicarbonate or hydroxide, etc., while not considered necessary, nevertheless is preferred in the proportion of about 5 to 25 percent of the weight of the carboxylic acid salt. It is to be understood that up to 50% of such a base may be used, since the proportions are not critical. The sodium carbonate or its equivalent neutralizes any acid produced by decomposition of unstable halides or free hydrogen halide which may be present in the terpenic allylic halide, thus rendering the reaction mixture less corrosive. Furthermore, the presence of such a base may be necessary or very desirable where a phosphine is generated in situ. For example, equal equivalents of geranyl/neryl chloride and sodium acetate may be heated for six hours at 90° C. in the presence of yellow phosphorus with formation of only small quantities of geranyl/neryl ester and with little disappearance of geranyl/neryl chloride. Under the same conditions, but in the presence of 10 to 20 percent sodium carbonate, based on the weight of the sodium acetate used, a good yield of geranyl-neryl actate results and no geranyl/neryl chloride remains. Also, in the absence of sodium carbonate or equivalent base, aryl/alkyl/amino phosphorus halides show poor catalytic activity, but if they are first added to sodium carbonate, then treated with a mixture of geranyl/neryl halide and salt of the carboxylic acid, their activity as precursors for the phosphine catalysts is enhanced, due to their conversion to disproportionation products including phosphines. It will be appreciated that in these two specific cases the function of the sodium carbonate is to assist in formation of catalyst, but not otherwise enter into the reaction, except to neutralize acidity formed from, or present in, the terpenic allylic halide.

While I prefer to avoid operation in aqueous systems, I usually employ commercially anhydrous sodium carbonate and salts of carboxylic acids which can ordinarily contain up to several percent water and additional water is generated through the reaction of sodium carbonate and acid during the reaction.

The non-volatile oil remaining from the steam distillation of saponified reaction products produced by the process of my invention contains organic phosphorus compounds. The infrared spectrum of this non-volatile oil indicates the presence of terpenic phosphine oxides which would be expected to result from decomposition of a terpenic quaternary salt in the presence of strong alkali or result from air oxidation of a tertiary terpenic phosphine.

The terpenic allylic chloride can be acyclic, monocyclic or bicyclic. Each type is subject to catalysis by phosphines in their reactions with carboxylic acid salts.

Although the molar ratio of terpenic allylic halide to the salt of the carboxylic acid is not critical, it is preferred to employ about one to two equivalents of the carboxylic acid salt per equivalent of the allylic halide.

Solvents are not required, but may be employed if desired. Although agitation is not necessary, it is preferred to agitate to maintain good contact between the liquid terpenic allylic chloride phase and the solid salt phase.

The phosphine catalyzed reaction of the halide with the salt of the carboxylic acid usually proceeds so slowly at ambient temperatures that temperatures of 60° C. to 160° C. are preferred. Depending on the identity of the halide, reactions may require about 10 to 100 hours at 60° C., as compared to a few minutes to several hours at 160° C. Undesirable dehydrochlorination of the halides to hydrocarbons occurs at higher temperatures; for example, about 90° C., if trace metals such as copper or iron are present in the starting chloride. This undesirable effect is suppressed to some extent by phosphines by virtue of their ability to form complexes with the metals, but elemental phosphorus in excess exerts a much greater effect in scavenging such metals and thereby stabilizing the halide at higher temperature.

As little as 0.1% of catalyst, based on the weight of the terpenic halide, such as tri-n-butyl phosphine, exhibits catalytic activity if the halide employed is free of copper and other heavy metals and if air is carefully excluded from the reaction. If metals are present, then catalytic activity is lost to the extent the phosphine complexes with the metal salt. Most tertiary phosphines are readily oxidized by air to the phosphine oxide, although certain phosphines, such as triphenyl phosphine, are more stable. To the extent that the phosphine is oxidized to the phosphine oxide, catalytic activity is lost; therefore, it is preferred to avoid the introduction of air or other oxidants. The reaction may be blanketed with inert gas, but this is not necessary. It is convenient, however, to add to the reaction mixture about 5% to 50% by weight of sodium carbonate, based on the weight of the salt, of the carboxylic acid. The very slow dehydrohalogenation of the halide throughout the reaction provides acid to liberate enough carbon dioxide to prevent intrusion of air and maintain the reaction mixture and the atmosphere above it in a relatively non-corrosive state.

While as little as 0.1%, based upon the weight of the terpenic halide, or less catalyst may be used under ideal conditions, i.e in the absence of air or other oxidant and in the absence of metal salts capable of complexing with the phosphine, it is usually preferred to employ 0.5% to 5% catalyst. Actually, any amount of the catalyst which produces a measurable increase in the yield of the esters may be used. Elemental phosphorus, if used as the catalyst precursor, may be present in traces in the reaction product and will be destroyed during the saponification of the esters to the corresponding alcohols. It has always been found that the steam distilled alcohols are free of phosphine odors.

It will be appreciated that if a volatile phosphine such as phosphine itself is used, the reaction can be conducted under pressure to avoid escape of the phosphine until it reacts by alkylation to give less volatile products.

Any carboxylic acid salt, including the alkali metals such as sodium, potassium, ammonium, or amine salts, etc., can be employed to form the corresponding ester of the allylic terpene alcohol. If it is desired to produce the ester and then saponify it to obtain the alcohol, then the preferred, cheapest and most readily available carboxylic acid salts include, but are not limited to, the sodium salts of the lower fatty acids, notably formic and acetic acid. If it is desired to produce a specific ester such as geranyl/neryl isovalerate, then one may choose to react myrcene hydrochloride, rich in geranyl and neryl chloride, with sodium isovalerate in the presence of the phosphine catalyst. Potassium and other salts may be used, but are more expensive and frequently less commercially available.

While one may employ pure allylic terpenic halides, it is usually preferred to employ the crude products of hydrohalogenation of terpenic dienes or chlorination products of the terpenes or unsaturated hydroterpenes. These reactions yield substantial amounts of primary and/or secondary allylic halides, which are much better suited to reaction with salts of carboxylic acids to form esters than are tertiary allylic halides. Thus hydrochlorination of myrcene produces a mixture of the tertiary chloride (linalyl chloride) and the primary chlorides (neryl and geranylchloride). This mixture, when converted to esters by my process, gives far higher yields of ester, based on consumption of the primary chlorides, than based on the consumption of the tertiary chloride. Non-allylic tertiary chlorides, such as terpinyl chloride, are practically unreacted under the conditions of my process.

Since the treatment of myrcene hydrochloride with a salt of a carboxylic acid in the presence of a catalytic material is an important aspect of this invention, it is important to define this allylic terpenic halide composition. Knapp and Schoene, in U.S. Patent No. 2,609,388, show that myrcene may be hydrohalogenated with 0.75 to 1.25 moles of hydrogen halide per mole of myrcene to yield mixtures of linalyl halide, neryl halide, and geranyl halide, and presumably also 2-chloro-dihydro (linalyl-geranyl-neryl) halide at least when more than one mole hydrogen halide is added to one mole of myrcene. It is also disclosed that more or less of the hydrogen halide may add to the isolated double band at the 2-position, thus yielding 2 - chloro - 2 - methyl-6-methylene-7-octene (myrcenyl chloride). It is evident that the composition of myrcene hydrochloride can vary over a wide range, depending upon the ratio of hydrogen halide to myrcene employed. It is also pointed out in this patent that the ratio of allylic isomers can be varied by varying the reaction conditions. Though Knapp and Schoene only specify the ratio of 0.75 to 1.25 moles of hydrogen chloride per mole of myrcene, their Example 5 shows they reacted 58 parts of commercial beta pinene pyrolysate, consisting of about 60% myrcene and 40% limonene, with 16.5 parts of hydrogen chloride. This corresponds to 1.77 mole hydrogen chloride per mole of myrcene. The degree to which the limonene present was hydrochlorinated is not stated. Weiss showed in U.S. Patent No. 2,882,323 that when hydrochlorination is conducted in the presence of copper catalysts, including cuprous compounds and copper, the addition of the hydrogen halide is directed almost exclusively to the conjugate system of myrcene when ratios of about one mole hydrogen halide to one mole of myrcene are used, little myrcenyl chloride being produced. Furthermore, inspection of FIGURE 1 of the latter patent, an infrared spectrum of myrcene hydrochlorinated in the presence of copper bronze, shows that the product is quite rich in neryl/geranyl chloride, as indicated by the strong absorption at about $8\mu$ characteristic of these halides. Some linalyl chloride is also present in that product, as shown by the absorption at about $10.8\mu$, an absorption characteristic of linalyl chloride. It is further shown in U.S. Patent No. 3,016,408 that cupric chloride and other cupric compounds are useful in obtaining selective addition of hydrogen halide to the conjugate diene portion of the molecule, though it is stated that cupric copper catalyzed addition yields a larger proportion of linalyl chloride than does cuprous catalyzed hydrochlorination. It is stated, however, that this larger proportion of linalyl chloride can be isomerized, if desired, to geranyl chloride by maintaining it at room temperature or below in the presence of cuprous chloride and hydrogen chloride.

Since geranyl chloride and the isomeric neryl chloride, which always accompanies it, and which are equivalent for the purposes of producing geranyl/neryl esters are much more reactive than their allylic isomer, linalyl chloride, it is preferred to use myrcene hydrochloride rich in geranyl/neryl chloride and produced by one of the above or equivalent methods. It has been found, however, that for the purposes of my present invention, I can produce a suitable myrcene hydrochloride, rich in primary allylic chlorides, by hydrochlorination of beta pinene pyrolysate containing about 70% to 90% myrcene, using a ratio of about 0.9 to 1.2 moles of hydrogen chloride per 136 grams of beta pinene pyrolysate, to obtain a product still rich in conjugated diene linkages (myrcene and myrcenyl chloride), then subjecting this product to treatment with about 0.5% to 5% cuprous chloride for a few hours at room temperature or up to several days at about — 30° C., whereby (a) as expected from the prior art, linalyl chloride is isomerized to geranyl and neryl chloride, and 2-chloro-dihydrolinalyl chloride is isomerized to 2-chloro-dihydrogeranyl chloride, and (b) unexpectedly the conjugated diene linkages exhibited by myrcene and myrcenyl chloride disappear with formation of additional amounts of geranyl/neryl chlorides (and/or 2-chloro-dihydro geranyl/neryl chlorides). This unexpected but desirable result can be attributed to the rearrangement of unstable chlorides, such as myrcenyl chloride to geranyl/neryl chloride, under the influence of cuprous copper. The progress of the rearrangement may be readily followed by infrared analysis of samples of the myrcene hydrochloride produced without hydrochlorination catalyst before and after addition of the cuprous catalyst. Prior to addition of catalyst the spectrogram strongly resembles FIGURE 2 of U.S. Patent No. 2,882,-323, which depicts the product obtained with myrcene and a useless catalyst, in this case, cobaltous chloride. As shown in that spectrogram, much diene (myrcene and/or myrcenyl chloride) is present, as shown by the strong absorptions at about $6.3\mu$ and $11.2\mu$, and little geranyl chloride is present, as shown by the relatively weak absorption at about $8\mu$. After treatment with cuprous chloride, as described, this product chanuges so that its spectrogram no longer resembles FIGURE 2, but strongly resembles FIGURE 1, which is rich in primary allylic chloride, i.e. geranyl and neryl chloride, and substantially free of conjugated dienes.

While one may use any of the so-called "myrcene hydrochlorides" produced in the various ways cited above, it is preferred to employ products rich in geranyl chloride. The myrcene hydrochloride can contain more or less myrcene dihydrochloride, i.e. more or less myrcene hydrochlorinated at the 2-position. Thus 2-chloro-dihydrogeranyl chloride can be converted by this process to 2-chloro-dihydrogeranyl ester, and this product can be dehydrochlorinated by heating at temperatures of about 100° C. to 150° C. in the presence of a base capable of neutralizing the hydrogen chloride produced, such as sodium carbonate.

The following examples illustrate the present invention further:

EXAMPLE 1

As an example of the process of this invention, geranyl chloride is stirred for hours with a slight molar excess of sodium acetate at 80°. C. to 100° C. in the presence of a catalytic quantity of tributyl phosphine —about 1%— based on the weight of the geranyl chloride, whereupon geranyl acetate is produced in 75% to 95% of theory. In the absence of the phosphorous catalyst, the yield would be at best in the order of 15% to 25% and would never approach the yield of the catalyzed reaction, even when treated for much longer periods, since undesirable reactions, such as dehydrochlorinations and cyclization, would eventually intervene and lower the ester yield. In a similar example, one mole of geranyl chloride and two moles of sodium acetate were charged into an autoclave and about three grams phosphine was added as a gas under pressure. The autoclave was heated with agitation for 8 hours at 80° C. to 125° C. The saponified oils contained 51% nerol-geraniol.

EXAMPLE 2

As another example of the process of my invention, 187 parts by weight of a myrcene hydrochloride containing about 65% geranyl chloride (prepared by the method of R. Weiss, U.S. Patent No. 2,882,323, April 14, 1959) is treated with 100 parts by weight of sodium acetate and 20 parts by weight of anhydrous sodium carbonate at 100° C. to 110° C., and in the presence of 1 to 4 parts by weight of yellow phosphorus for 6 hours. The crude geranyl acetate is saponified with about 20% excess of 25% (w./w.) aqueous sodium hydroxide, and the crude geraniol is steam distilled and then fractionated to obtain about 80 to 95 parts by weight of a mixture of nerol and geraniol. This yield is in the order of five times or more better than would be obtained if no catalyst were used.

EXAMPLE 3

187 grams myrcene hydrochloride, containing about 65% to 75% neryl/geranyl chloride, is treated with 100 grams commercial anhydrous sodium acetate, 20 grams commercial anhydrous sodium carbonate, and various catalysts under the conditions specified in Table I. Samples are saponified with alcoholic potassium hydroxide for one hour and the saponified oils after water washing and drying are analyzed by vapor phase chromatography for their total nerol and geraniol content. In all cases the ratio of these cis-trans isomers is approximately 40 parts nerol to 60 parts geraniol. Only traces up to a few percent linalool were present in these reactions.

EXAMPLE 4

Varying amounts of commercial anhydrous sodium acetate and sodium carbonate are heated with 187 parts by weight of myrcene hydrochloride containing 65% to 75% neryl/geranyl chloride and in the presence of either phosphorus or tris diethylaminophosphine. After the indicated reaftion times, the products are saponified with 25% excess of 25% by weight aqueous caustic soda for 8 hours at 105 to 110° C., and the mixture is steam distilled to obtain the volatile products. The yields of nerol/genan-oil produced under the specified condition are shown in Table II.

TABLE I

| Weight and Catalyst | Reaction Temp., °C | Reaction Time, Hours | Total Nerol/ as Percent by Weight of Saponified Oil. |
|---|---|---|---|
| 1.2 g. yellow phosphorus | 80–84 | 16 | 45.4 |
| 3.0 g. yellow phosphorus | 77–83 | 18 | 61.2 |
| 4.0 g. tributyl phosphine | 78–83 | 4.75 | 58 |
| 4.0 g. tris diethylamino phosphine | 81–85 | 3 | 48.4 |
|  | 81–85 | 7 | 59.5 |
| 4.0 g. yellow phosphorus | 81–85 | 3 | 19.0 |
|  | 81–85 | 5 | 34.5 |
|  | 81–85 | 17 | 49.2 |
|  | 81–85 | 7 | 61.2 |
| Do | 120 | 1 | 53.2 |
|  | 120 | 1.75 | 58.5 |
| 2.0 g. yellow phosphorus | 110 | 4.5 | 62.8 |
| 4.0 g. bis-diethylamino-phenyl-phosphine | 80–85 | 5.5 | 58.2 |
| 6.0 g. morpholino-diphenyl phosphine | 80–85 | 15.5 | 57 |
| None | 80–85 | 12 | 13 |
| 4.0 g. triphenyl phosphine | 80–85 | 2 | 62 |
| 2.0 g. yellow phosphorus | 120–160 | 1 | 51 |
| 3.0 g. phenyl phosphine | 120–160 | 2 | 54 |

TABLE II

| Sodium Acetate | Sodium Carbonate | Weight Catalyst | Reaction Temperatures, °C. | Esterification Time, Hours | Weight Geraniol/ Nerol in Steam Distillate |
|---|---|---|---|---|---|
| 100 g | 20 g | 2 g. phosphorus | 100–108 | 6.4 | 87.4 |
| 60 g | 26 g | do | 100–110 | 7.3 | 79.5 |
| 100 g | 20 g | 4 g. trisdiethyl-amino phosphine. | 80–85 | 7 | [1] 93.3 |

[1] Also 5.9 g. linalool.

EXAMPLE 5

187 grams myrcene hydrochloride rich in geranyl/neryl chlorides and containing some copper salts is treated with the indicated quantities of: the specified carboxylic acid salt, the specified catalyst, the specified quantity of sodium carbonate and under various time and temperature conditions. The reaction products are analyzed by saponification of the ester and vapor phase chromatographic analysis of the water washed and dried crude saponification product with the results shown in Table III.

EXAMPLE 6

One mole of a terpenic allylic halide, as shown below, is treated with one and a half moles sodium acetate, 20 grams of sodium carbonate and 5 grams of the specified catalyst, and the mixtures are heated over a period of about two hours to 110° C. to 120° C. After the reaction mixture is held at this temperature for eight hours, the product is washed with water to remove salts and the percent ester is assayed by infrared spectro-analysis.

TABLE IV

| Catalyst | Time (Hours) | Temperature, ° C. | Percent Nerol/Geraniol |
| --- | --- | --- | --- |
| n-Heptyl triphenyl phosphonium bromide | 5.5 | 80 | 54.6 |
| Allyl triphenyl phosphonium bromide | 5.5 | 80 | 39.4 |
| Do | 7.6 | 80 | 46.7 |
| Methallyl triphenyl phosphonium chloride | 5.5 | 80 | 21 |
| Allyl tri (diethylamino) phosphonium iodide | 6 | 90 | 57 |

To emphasize the catalytic activity of the phosphonium salts, the results in Table IV may be compared to the results obtained by use of trimethyl phosphite which has practically no activity. In this experiment 100 ml. of the

| Terpenic Allylic Halide | Catalyst | Percent by Weight Ester in Reaction Product |
| --- | --- | --- |
| 5-chloro-3-menthene | Trisdiethylaminophosphine | 65 |
| Do | Yellow phosphorus | 47 |
| Do | None | 16 |
| Pinocarvyl chloride | Tributylphosphine | 57 |
| Carvyl chloride | Yellow phosphorus | 62 |
| Myrcene dihydrochloride | Trisdiethylaminophosphine | 69 |
| Alpha terpinene hydrochloride | Yellow phosphorus | 21 |
| Geranyl bromide | do | 77 |
| Do | None | 37 |
| Carvotanacetyl bromide | Tributyl phosphine | 68 |

EXAMPLE 7

Quaternary phosphonium halides were tested for their catalytic activity by treating 100 ml. myrcene hydrochloride rich in geranyl chloride and containing traces of copper with 50 g. sodium acetate, 10 g. sodium carbonate and 3 grams of the specified quaternary phosphonium halide at the temperatures and for the times specified. The reaction products were saponified with methanolic potassium hydroxide, and the saponified product, after washing and drying, was assayed by vapor phase chromatography. Reaction conditions and percent nerol/geraniol in the saponified sample are shown in Table IV.

same myrcene hydrochloride as used with the phosphonium compounds was treated with 50 g. sodium acetate, 10 g. sodium carbonate, and 3 cc. trimethyl phosphite at 93° C. to 105° C. for four hours. The reaction product was found to be still rich in geranyl chloride by infrared analysis and alcoholic saponification of the product followed by vapor phase chromatography showed the product to contain only 2.7% nerol/geraniol, about the quantity of nerol/geraniol to be expected, using no catalyst under these conditions. If sodium carbonate had been omitted, some free acetic acid would have formed and the geraniol/nerol produced would have been greater, perhaps 5% to 10%.

TABLE III

| Reaction | Weight Carboxylic Salt | Weight Sodium Carbonate | Weight Catalyst | Reaction Temp., ° C. | Reaction Time, Hours | Percent Nerol/Geraniol in Saponified Oil |
| --- | --- | --- | --- | --- | --- | --- |
| 1 | 100 g. sodium acetate | None | 5 g. tributyl phosphine | 100–115 | 6 | 61 |
| 2 | 68 g. sodium formate | 26 g. | 4 g. tributyl phosphine | 83 | 4.8 | 23 |
|  | After above sample taken, 5 g. more catalyst added and reaction continued for 3 hours |  |  |  |  | 51 |
| 3 | 80 g. sodium formate | 26 g. | 4 g. yellow phosphorus | 76–83 | 11.25 | 22.5 |
|  | Reaction continued for a total of |  |  |  | 19.8 | 41 |
| 4 | 83 g. sodium formate | 20 g. | 4 g. yellow phosphorus | 120–126 | 5 | 44.7 |
| 5 | 68 g. sodium formate | 26 g. | do | 120 | 5.75 | 53 |
| 6 | 300 g. sodium oleate | None | 4 g. Tributyl phosphine | 100 | 7 | 47 |
| 7 | 250 g. potassium phthalate | 30 g. | 4 g. yellow phosphorus | 115–135 | 6 | 49 |
| 8 | 150 g. potassium isovalerate | 20 g. | 6 g. yellow phosphorus | 110–115 | 3 | 42 |
| 9 | do | 10 g. | 5 g. trisdiethylamino phosphine | 85–105 | 7 | 57 |
| 10 | 250 g. sodium sebacate | 25 g. | 10 g. trispiperidino phosphine | 80–120 | 10 | 54 |
| 11 | 85 g. sodium fumarate | 15 g. | 5 g. tris dimethylamino phosphine | 80–105 | 15 | 38 |
| 12 | 90 g. potassium benzoate | 10 g. | 10 g. dimethyl, benzyl phosphine | 100–140 | 4 | 55 |
| 13 | 110 g. sodium propionate | 5 g. | Tris (t-butylamino) phosphine | 90–107 | 6 | 47 |
| 14 | 100 g. ammonium acetate | None | 5 g. tributylphosphine | 100–115 | 5 | 57 |
| 15 | 145 g. triethylamine salt of butyric acid | 3 g. | 1 g. tris morpholino phosphine | 100–115 | 6 | 56 |
| 16 | 250 g. potassium acid phthalate | None | 10 g. diisoamyl phenyl phosphine | 100–105 | 9 | 51 |
| 16 | do | do | None | 100–105 | 9 | 21 |

EXAMPLE 8

*Use of amines with $PCl_3$ or $PBr_3$ for in situ preparation of catalyst*

One mole geranyl chloride is mixed with 0.06 moles ethylenimine and 0.02 mole phosphorus trichloride (or 0.02 mole phosphorous tribromide) for 1 hour at 30° C. to 50° C. to produce a solution of tris (B-haloethylamino) phosphine and quaternized derivatives in geranyl chloride. This mixture is treated with 1.5 moles sodium acetate and heated with agitation to 110° C. over a period of 10 hours. The water-washed product assays about 87% geranyl acetate.

In general, the ethylenimine employed as above may be replaced with 0.12 moles or more of any primary or secondary amine. In this case, however, the geranyl chloride solution of the amino phosphine may be washed with water and a dilute aqueous acid, such as 2% aqueous mineral or strong organic acid, in order to remove by-product amine hydrochloride and excess amine, if any. After the removal of any free amine and amine hydrochloride, the geranyl chloride solution of the amino phosphine catalyst is treated with sodium acetate under conditions similar to those described above. Yields of geranyl acetate are 75% to 95%.

EXAMPLE 9

*Metal phosphides as in situ sources of phosphines*

187 grams myrcene hydrochloride was agitated with 20.0 g. sodium carbonate, 100 g. sodium acetate, and 6.0 g. commercial powdered zinc phosphide. The mixture was heated rapidly to 85° C., then slowly to 110° C. Total reaction time was 5 hours, 20 minutes. A sample of the reaction mixture was saponified with excess methanolic potassium hydroxide and then washed and dried saponified oil was assayed by vapor phase chromatography. It contained 52.7% nerol plus geraniol.

EXAMPLE 10

The same experiment was repeated, but using 20 g. finely ground commercial calcium phosphide instead of zinc phosphide to produce a saponified oil containing 47% nerol/geraniol. It was evident this reaction was incomplete, since the saponified oils contained about 12% geranyl/neryl methyl ethers resulting from the reaction of geranyl/neryl chlorides with the methanolic alkali.

EXAMPLE 11

Sodium phosphide was prepared by adding 10 g. yellow phosphorus to 10 g. sodium dispersed in 100 g. xylene, followed by heating the mixture to the boiling point for 1 hour. After cooling under nitrogen, 200 g. myrcene hydrochloride, 20 g. sodium carbonate, and 150 g. sodium propionate were added and the mixture was heated to 125° C. over a 6-hour period. The ester was saponified and the washed oils, after distillation of the xylene, analyzed 56% geraniol/nerol.

From the foregoing detailed description it will be evident that there are a number of changes, adaptations, and modifications of the present invention which come within the province of those skilled in the art; however, it is intended that all such variations not departing from the spirit of the invention be considered as within the scope thereof as limited solely by the appended claims.

I claim:

1. An improved process for preparing terpene allylic esters which comprises subjecting a terpene allylic halide, in which the halogen is selected from the class consisting of chlorine and bromine, to a displacement reaction by treatment with a carboxylic acid salt in the presence of a salt of a quaternary phosphorus base as a catalyst, said catalyst being in sufficient amounts to measurably increase the yield of said esters.

2. The process of claim 1, in which the terpene allylic halide is myrcene hydrochloride and at a temperature between 60°–160° C., the catalyst being present in an amount greater than .1% based on the weight of the halide.

3. An improved process for preparing esters of terpenic compounds, comprising reacting a terpene allylic halide in which the halogen is selected from the class consisting of chlorine and bromine with a carboxylic acid salt in the presence of a phosphorus-containing catalyst selected from the group consisting of phosphorus, phosphonium salts, and trivalent phosphorus compounds having the formula

wherein R, $R_1$ and $R_2$ are selected from the group consisting of hydrogen, alkyl, cycloalkyl, aryl, alkylamino, aryl amino, cycloalkylamino and amino, said catalyst being in sufficient amounts to measurably increase the yield of said esters.

4. The process of claim 3, in which the phosphorus catalyst is white phosphorus.

5. The process of claim 3. in which the phosphorus catalyst is a trialkyl phosphine.

6. The process of claim 3, in which the phosphorus catalyst is a tris alkylamino phosphine.

7. The process of claim 3, in which the phosphorus catalyst is an amino phosphine.

8. In a process for producing geranyl esters, wherein myrcene monohydrochloride is subjected to a displacement reaction by treatment with a carboxylic acid salt, the improvement which consists essentially in effecting the displacement reaction in the presence of a phosphorus catalyst, said catalyst being selected from the group consisting of phosphorus and a phosphorus-containing compound capable of alkylation to a salt of a quaternary phosphorus base, said catalyst being in sufficient amounts to measurably increase the yield of said esters.

9. The process of claim 8, in which the phosphorus catalyst is phosphorus.

10. The process of claim 8, in which the catalyst is a phosphine.

11. In a process for preparing esters of terpenic allylic alcohols, wherein an allylic terpenic halide, in which the halogen is selected from the class consisting of chlorine and bromine, is subjected to a displacement reaction by treatment with a carboxylic acid salt under non-aqueous conditions, the improvement which consists essentially in effecting said displacement reaction in the presence of a phosphorus-containing catalyst selected from the group consisting of phosphorus, phosphonium salts, and trivalent phosphorus compounds having the formula

wherein R, $R_1$ and $R_2$ are selected from the group consisting of hydrogen, alkyl, cycloalkyl, aryl, alkylamino, aryl amino, cycloalkylamino and amino, said catalyst being in sufficient amounts to measurably increase the yield of said esters.

12. The process of claim 11, wherein the phosphonium salt is a salt of a quaternary base, said base having the formula

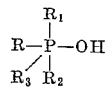

wherein R, $R_1$, $R_2$ and $R_3$ may be selected from the group consisting of hydrogen, alkyl, cycloalkyl, aryl, alkylamino, arylamino, cycloalkylamino, and amino.

13. In a process for preparing esters of terpenic allylic alcohols, wherein a terpenic allylic halide, in which halogen is selected from the class consisting of chlorine and bromine, is subjected to a displacement reaction by treatment with a carboxylic acid salt in the presence of 5% to 50% sodium carbonate by weight based on the carboxylic acid salt, the improvement of which consists essentially in effecting said displacement reaction in the presence of a phosphorus catalyst capable of alkylation to produce a salt of a quaternary base, said catalyst being in sufficient amounts to measurably increase the yield of said esters.

14. The process of claim 13, in which the phosphorus catalyst is elemental phosphorus.

15. The process of claim 13, in which the phosphorus catalyst is a phosphine.

16. An improved process for preparing terpene allylic esters which comprises subjecting a terpene allylic halide, in which the halogen is selected from the class consisting of chlorine and bromine, to a displacement reaction by treatment with a carboxylic acid salt in the presence of a salt of a quaternary phosphorus base as a catalyst, said catalyst being in sufficient amounts to measurably increase the yield of said esters, producing said catalyst in situ including the step of producing a phosphine from reactants selected from the group consisting of trivalent phosphorus halide, metal phosphide, and elemental phosphorus.

17. An improved process for preparing terpene allylic esters which comprises subjecting a terpene allylic halide, in which the halogen is selected from the class consisting of chlorine and bromine, to a displacement reaction by treatment with a carboxylic acid salt in the presence of a salt of a quaternary phosphorus base as a catalyst, said catalyst being in sufficient amounts to measurably increase the yield of said esters, producing said catalyst in situ by the reaction of trivalent phosphorus halide with a compound selected from the group consisting of alkyl-, hydrogen-, cycloalkyl-, aryl-, alkylamino-, arylamino-, cycloalkylamino-, and amino- halides and amines.

18. An improved process for preparing terpene allylic esters which comprises subjecting a terpene allylic halide, in which the halogen is selected from the class consisting of chlorine and bromine, to a displacement reaction by treatment with a carboxylic acid salt in the presence of a salt of a quaternary phosphorus base as a catalyst, said catalyst being in sufficient amounts to measurably increase the yield of said esters, producing said catalyst in situ from a metal phosphide in the presence of a base.

19. The process of claim 18, wherein the base is selected from the group consisting of carbonates, bicarbonates, and hydroxides and is present in the amount of 5–25% by weight of the carboxylic acid salt.

References Cited by the Examiner

UNITED STATES PATENTS

| | | | |
|---|---|---|---|
| 2,995,600 | 8/1961 | Webb | 260—488 |
| 3,031,442 | 4/1962 | Webb | 260—488 |
| 3,062,874 | 11/1962 | Bay | 260—489 |
| 3,076,839 | 2/1963 | Webb | 260—489 |

LORRAINE A. WEINBERGER, *Primary Examiner.*

V. GARNER, *Assistant Examiner.*